United States Patent [19]

Craun et al.

[11] Patent Number: 5,508,325
[45] Date of Patent: Apr. 16, 1996

[54] AQUEOUS DISPERSED, ACRYLIC GRAFTED EPOXY MICROGEL PROTECTIVE COATINGS

[75] Inventors: Gary P. Craun, Berea; David J. Telford, Medina; Henry J. DeGraaf, Stow, all of Ohio

[73] Assignee: The Glidden Company, Cleveland, Ohio

[21] Appl. No.: 374,885

[22] Filed: Jan. 19, 1995

[51] Int. Cl.⁶ .................................................. C08L 63/00
[52] U.S. Cl. .......................... 523/410; 523/403; 523/407; 525/117
[58] Field of Search ........................... 524/600; 523/423, 523/428, 403, 406, 407, 410; 525/107, 117

[56] References Cited

U.S. PATENT DOCUMENTS 4,487,861  12/1984  Winner .................................... 523/428
5,252,637  10/1993  Craun et al. ............................ 523/423

Primary Examiner—Jeffrey Smith
Attorney, Agent, or Firm—Thomas M. Schmitz

[57] ABSTRACT

An aqueous protective coating composition particularly useful for can coatings is based on a polymeric binder comprising epoxy crosslinked microgel particles. The microgel polymer is produced by dispersing into water a carbon grafted, carboxyl functional acrylic-epoxy copolymer, and combined with low molecular weight diepoxide, followed by coreaction and crosslinking between the carboxyl copolymer and diepoxide to form stable aqueous dispersed microgel particles.

17 Claims, No Drawings

AQUEOUS DISPERSED, ACRYLIC GRAFTED EPOXY MICROGEL PROTECTIVE COATINGS

This invention pertains to aqueous dispersed acrylic grafted epoxy microgel polymers particularly useful as polymeric binders for protective surface coatings applied to a substrate and particularly useful as can coatings for beverage and food containers.

BACKGROUND OF THE INVENTION

Industrial coatings are surface protective coatings (paint coatings) applied to substrates and typically cured or crosslinked to form continuous films for decorative purposes as well as to protect the substrate. A protective coating ordinarily comprises an organic polymeric binder, pigments, and various paint additives, where the polymeric binder acts as a fluid vehicle for the pigments and imparts rheological properties to the fluid paint coating. Upon curing or crosslinking, the polymeric binder hardens and functions as a binder for the pigments and provides adhesion of the dried paint film to the substrate. The pigments may be organic or inorganic and functionally contribute to opacity and color in addition to durability and hardness. Protective coatings which contain little or no opacifying pigments are described as clear coatings. The manufacture of protective coatings involves the preparation of a polymeric binder, mixing of component materials, grinding of pigments in the polymeric binder, and thinning to commercial standards.

Epoxy resins are particularly desirable for use in protective surface coating materials as a vehicle or polymeric binder for the pigments, fillers, and other additives where the epoxy resins advantageously provide toughness, flexibility, adhesion, and chemical resistance. Water-dispersed coating compositions containing epoxy resins are highly desirable for can coating compositions and particularly useful for interior surfaces of containers. Coatings for soft drink and beer cans, for instance, are critical due to taste sensitivity wherein such can coatings must not alter the product taste of beverages in the containers. Taste problems can occur in a variety of ways such as by leaching of coating components into the beverage, or by absorption of flavor by the coating, or sometimes by chemical reaction, or by perhaps some combination thereof.

Container coating technology frequently utilizes an epoxy resin which has been grafted with acrylic monomers, styrene, and methacrylic acid. This grafted epoxy resin is prepared in solvent, usually butyl cellosolve, and n-butanol, to maintain low processing viscosities and then reduced with water by a direct or inverse let down procedure. Although cured film properties are highly desirable, such coatings suffer from the fact that sizeable amounts of solvents are required to obtain good performance. High molecular weight epoxy resins typically require 25% to 50% solvent (based on total solids plus organic solvent) before reducing with amine and water.

Epoxy based can coatings comprising a carbon grafted acrylic chain are disclosed is commonly assigned U.S. Pat. No. 4,212,781 which teaches a carbon grafting process involving solvent polymerization at moderate temperatures with high levels of peroxide initiator to produce a carbon-graft polymer. The high solvent levels, however, invariably carry over to the aqueous dispersion when the resulting polymers are dispersed into water to produce a VOC (volatile organic compounds) level considerably above 2 and typically between 3 and 4 pounds volatile organic compounds per gallon of resin solids. The acrylic grafted epoxy is particularly useful when utilized with a coreactive crosslinking melamine crosslinker.

Aqueous coating compositions based on microgel resin reaction product obtained by the esterification reaction of epoxy resin with carboxyl group containing vinyl polymer are disclosed in U.S. Pat. No. 4,897,434 where major amounts of high molecular weight epoxy are esterified in organic solvent with the carboxyl vinyl polymer to produce a non-gelled epoxy ester. The epoxy ester is subsequently dispersed into water followed by further coreacting of available epoxy and carboxyl groups on the preformed epoxy ester to form a microgel product.

It now has been found that excellent aqueous dispersed protective coating compositions exhibiting improved film integrity properties can be prepared based on a polymeric binder comprising an aqueous dispersed carbon grafted acrylic epoxy copolymer microgel. In accordance with this invention, a carboxyl functional acrylic carbon grafted epoxy is dispersed into water to provide an aqueous dispersion capable of dispersing liquid low molecular weight diepoxide resin. The low molecular weight diepoxide is dispersed and then coreacted with carboxyl functionality of the dispersed acrylic grafted epoxy resin to crosslink and form aqueous dispersed microgel particles. The microgel comprises stable, aqueous dispersed, small particle size microgel particles useful as a polymeric binder for coatings and particularly exhibiting excellent smoothness, clarity, gloss, and water resistance. These and other advantages of this invention will become more apparent by referring to the detailed description of the invention and the illustrative examples.

SUMMARY OF THE INVENTION

Briefly, the invention pertains to an aqueous dispersed protective coating composition containing a polymeric binder containing low levels of organic solvent, where the polymeric binder comprises aqueous dispersed microgel particles produced by dispersing into water a carboxyl functional acrylic grafted epoxy resin to form an aqueous mixture capable of dispersing low molecular weight diepoxide resin. After dispersion of the low molecular weight diepoxide resin, the diepoxide is coreacted and crosslinked with the carboxyl functional acrylic grafted epoxy to form stably dispersed, crosslinked microgel particles containing by weight between about 30% to 99% acrylic grafted epoxy with the balance being crosslinking diepoxide.

DETAILED DESCRIPTION OF THE INVENTION

The aqueous dispersed microgel polymer of this invention is based on a carboxyl functional acrylic carbon grafted epoxy copolymer dispersed into water and crosslinked by low molecular weight diepoxide resin in the aqueous dispersion to produce the microgel polymer particles.

The epoxy-acrylic copolymer is a carbon-graft copolymer comprising epoxy resin coreacted with ethylenic monomers including acrylic carboxyl monomers to produce a carbon-graft epoxy-acrylic graft copolymer. The preferred epoxy-acrylic copolymer comprises an epoxy-acrylic carbon-graft copolymer containing epoxy resin, epoxy-acrylic carbon-graft copolymer, and ungrafted addition polymer produced by polymerizing ethylenically unsaturated monomers in-situ with epoxy resin in the presence of a peroxide. The in situ polymerization of monomers generally comprises reacting the ethylenically unsaturated monomers in the presence of epoxy with about 1% to 10% peroxide by weight based on the monomer copolymerized. The in-situ formed carboxyl-functional polymer can have a molecular weight between 1,000 and 100,000 and preferably between 2,000 and 20,000. The carboxyl content (COOH) should comprise at least 5% by weight of the monomer mixture and preferably should be above 15%. The Acid Number should be above 30 and preferably between 70 and 300 mg KOH per gram of resin solids. Based on the weight of the acrylic grafted epoxy copolymer, the copolymerized acrylic or methacrylic acid content preferably is between 5% and 40% by weight of the copolymer.

The epoxy resin portion of the epoxy-acrylic copolymer mixture can be either aliphatic or aromatic, although the aromatic epoxy resins are preferred. The most preferred epoxy resins are polyglycidyl ethers of bisphenol-A, especially those having 1,2-epoxy equivalency of from about 1.3 to about 2. The molecular weight should be from about 350 to about 20,000 and preferably, for sanitary coating compositions, from about 2,000 to about 10,000. Mixtures of monoepoxides and diepoxides are desirable. Another procedural variation is the introduction of the aromatic polyether which is devoid of oxirane functionality by reacting epoxide groups with benzoic acid, fatty acid, phenol or similar monoreactive epoxide blocking agent. In preferred practice, the epoxy resin is a mixture including aromatic polyether having a single oxirane group and aromatic polyether having two oxirane groups which maximizes compatibility.

Epoxy resins are predominantly linear chain molecules comprising the coreaction product of polynuclear dihydroxy phenols or bisphenols with halohydrins to produce epoxy resins containing at least one and preferably two epoxy groups per molecule. The most common bisphenols are bisphenol-A, bisphenol-F, bisphenol-S, and 4,4'dihydroxy bisphenol, with the most preferred being bisphenol-A. Halohydrins include epichlorohydrin, dichlorohydrin, and 1,2-dichloro 3-hydroxypropane with the most preferred being epichlorohhydrin. Preferred epoxy resins comprise the coreaction product of excess molar equivalents of epichlorohydrin and bisphenol-A to produce predominantly an epoxy group terminated linear molecular chain of repeating units of diglycidyl ether of bisphenol-A containing between 2 and 25 repeating copolymerized units of diglycidyl ether of bisphenol-A. In practice, an excess molar equivalent of epichlorohydrin are reacted with bisphenol-A to produce epoxy resins where up to two moles of epichlorohydrin coreact with one mole of bisphenol-A, although less than complete reaction can produce difunctional epoxy resin along with monoepoxide chains terminated at the other end with a bisphenol-A unit. The most preferred linear epoxy resins are polyglycidyl ethers of bisphenol-A having terminating 1,2-epoxide groups and an epoxy equivalent weight between 2,000 and 10,000, and a number average molecular weight from about 4,000 to 20,000 as measured by gel permeation chromatography (GPC). Commercially available epoxy resins include Dow Chemical epoxy resins identified by trade number and equivalent molecular weights as follows: DER 661 (525); DER 664 (900); while Shell Chemical epoxy resins are EPON 1001 (525); EPON 1007 (2000); EPON 1009F (3000); and Ciba-Geigy linear epoxy resins GT-7013 (1400); GT-7014 (1500); GT7074 (2000); and GT-259 (1200). Although not as common, trifunctional epoxy resins are useful comprising branched chain epoxy resins where the branched chains as well as the backbone chain are each terminated with a terminal epoxide group to provide greater than two epoxide functionality. Trifunctional epoxy resins can be produced by coreacting epichlorohydrin with polynuclear polyhydroxy phenols, trifunctional phenols, or aliphatic trifunctional alcohols.

The acrylic portion of the carbon-graft epoxy-acrylic copolymer comprises polymerized ethylenically unsaturated monomers which include carboxyl functional monomers such as acrylic acid, and lower alkyl substituted acrylic acids such as methacrylic acid, and unsaturated dicarboxylic acids such as maleic or fumaric, to provide carboxyl functionality means for dispersing the epoxy-acrylic copolymer mixture into water. The preferred acrylic acid is methacrylic acid. The balance of the monomers preferably are nonreactive under the contemplated conditions of polymerization, although small amounts of other reactive monomers may be used such as hydroxy monomers illustrated by 2-hydroxy ethyl methacrylate, amide monomers illustrated by acrylamide, or N-methylol monomers illustrated by N-methylol acrylamide. The remaining monomers are nonreactive but copolymerizable ethylenic monomers illustrated by acrylate and methacrylate esters, such as ethyl acrylate, methyl methacrylate or isobutyl methacrylate, styrene, or vinyl toluene, vinyl acetate, vinyl chloride, vinylidene chloride, acrylonitrile, and generally alkyl esters of an acrylic acid, generally the lower alkyl esters, that is, those esters in which the esterifying group contains from 1 to 4 carbon atoms, and particularly ethyl acrylate. Other useful monomers in this class include other $C_{1-15}$ alkyl acrylate esters and methacrylate esters such as, for example, propyl acrylate, isopropyl acrylate, butyl acrylate, isobutyl acrylate, tertiary butyl acrylate, pentyl acrylate, decyl acrylate, lauryl acrylate, isobornyl acrylate, methyl methacrylate, butyl methacrylate, isobutyl methacrylate, hexyl methacrylate, 2-ethyl hexyl methacrylate, octyl methacrylate, and nonyl methacrylate. Other useful monomers are those readily commercial available monomers having vinyl unsaturation and include styrenic monomers such as styrene, vinyl toluene, divinyl benzene, isoprene and butadiene. The acrylic, methacrylic or similar unsaturated carboxyl monomer preferably comprises by weight between about 5% and 40% based on the weight of the acrylic grafted epoxy copolymer. Based on monomer weights copolymerized, the preferred acrylic acid or methacrylic acid monomer should comprise between 5% and 99% of the monomer copolymerized.

The preferred carbon-graft epoxy-acrylic copolymer mixture is prepared by in-situ non-aqueous polymerization of the ethylenic monomers with epoxy resin. The epoxy resin can be heated in the absence of water in a reactor wherein the polymerizable monomer can be added slowly over a period of at least two or three hours along with a solvent and a free radical initiator. Although the reaction may be conducted in the absence of solvent, a solvent is preferred for the in-situ polymerization of monomers in the presence of epoxy resin. Solvents such as xylene, benzene, ethyl benzene, toluene, and the alkoxy alkanols are satisfactory. Alcohols such as methanole, ethanol, propanol, butanol, and the like, are suitable, with butanol being preferred. Ethylene glycol monobutyl ether, ethylene glycol monohexyl ether, ethylene glycol monobutyl ether acetate, and the like, hexane, mineral spirits, and the like, are also suitable. For subsequent dispersion into water, the solvents selected should be water-soluble materials, as are acetone, butanol, ethanol, propanol, ethylene glycol monoethyl ether, and the like. Ordinarily the amount of solvent may be in the range from about 5% to 40% by weight of the sum of the other components.

In practice, the epoxy resin and the mixture of polymerizable monomers are reacted together in the presence of a free radical initiator, preferably of the peroxide type, and benzoyl peroxide t-butyl perebenzoate are most preferred. Typical and useful free radical initiators include cumene hydroperoxide, benzoyl peroxide t-butyl perbenzoate, t-butyl peroxide, lauryl peroxide, methyl ethyl ketone peroxide, dicumyl peroxide, chlorobenzoyl peroxide, and the like. Benzoyl peroxide and t-butyl perbenzoate are preferred as the free radical initiator for use in the practice of the present invention. The amount of free radical catalyst is expressed in terms of percentage by weight of peroxide based on the total weight of the polymerizable monomer, or equivalent, at the temperature of use. The amount of peroxide catalyst should be at least about 1% and preferably between 2% and 10% by weight peroxide initiator based on the weight of ethylenic monomers copolymerized. The monomers and initiators are heated at a reaction temperature preferably maintained in the range from about 80° C. to about 180° C., although the temperature may be adjusted within a relatively wide range to accommodate the reactivity of the mixture. Operating temperatures in the range from about 30° C. to about 200° C. are feasible, depending upon the end results and operating conditions selected, although the preferred temperature range is between 100° C. and 150° C. After the monomers are added, the reaction mixture is normally held for up to three hours at reaction temperature to complete the monomer conversions. The in-situ polymerization of the monomers produces an in-situ formed carboxyl functional polymer containing at least about 5% of polymerized acid monomer based on the total weight of monomers. The acrylic grafted epoxy copolymer should have an Acid Number above about 30 and preferably between 70 and 300 mgm KOH per gram of polymer. The carbon-graft, epoxy-acrylic copolymer composition comprises by weight between about 20% and 95% acrylic polymer and between about 5% and 80% epoxy resin.

The carbon graft epoxy acrylic copolymer is prepared in solvent and then subsequently dispersed into water using a fugitive base such as primary, secondary, and tertiary alkyl, alkanol, aromatic amines, or alkanolalkyl mixed amines such as monoethanol amine, dimethyl ethanol amine, diethanol amine, triethyl amine, dimethyl aniline, ammonium hydroxide, and the like, as more particularly described in U.S. Pat. No. 4,212,781.

Referring next to the low molecular weight diepoxide resins, useful resins for crosslinking the carboxyl functional acrylic graft epoxy copolymers are predominantly linear chain molecules comprising the coreaction product of polynuclear dihydroxy phenols or bisphenols with halohydrins to produce epoxy resins containing preferably two epoxy groups per molecule. The most common bisphenols are bisphenol-A, bisphenol-F, bisphenol-S, and 4,4 dihydroxy bisphenol, with the most preferred being bisphenol-A. Halohydrins include epichlorohydrin, dichlorohydrin, and 1,2-dichloro-3-hydroxypropane with the most preferred being epichlorohydrin. Preferred epoxy resins comprise the coreaction product of excess molar equivalents of epichlorohydrin with bisphenol-A to produce predominantly an epoxy group terminated linear molecular chain of repeating units of diglycidyl ether of bisphenol-A containing between 2 and 25 repeating copolymerized units of diglycidyl ether of bisphenol-A. In practice, an excess molar equivalent of epichlorohydrin are reacted with bisphenol-A to produce diepoxide epoxy resins where up to two moles of epichlorohydrin coreact with one mole of bisphenol-A, although less than complete reaction can produce difunctional epoxy resin along with monoepoxide chains terminated at the other end with a bisphenol-A unit. The preferred linear epoxy resins are polyglycidyl ethers of bisphenol-A having terminating 1,2-epoxide groups (oxirane groups) and a number average molecular weight between 200 and 10,000 and preferably from about 360 to 1,000 as measured by gel permeation chromatography (GPC). Commercially available lower molecular weight epoxy resins include Dow Chemical epoxy resins identified by trade number and average molecular weights as follows: DER 333 (380); DER 661 (1050); while Shell Chemical epoxy resins are EPON 828 (380); EPON 836 (625); EPON 1001 (1050); and Ciba-Geigy linear epoxy resins GT-7013 (1400); GT-7014 (1500); GT-7074 (2000) and GT-259 (1200). Preferred epoxy equivalent weight epoxy resins have an equivalent weight between 100 and 1,000, and preferably between 180 and 500. High equivalent weight epoxy resins do not disperse well, although epoxy blends containing minor amounts of higher molecular weight epoxy resins are workable.

Epoxy resins further include non-aqueous alkylene oxide resins which are epoxide functional resins comprising an alkylene oxide adduct of a bisphenol compound. The alkylene oxide is an aliphatic alkyl derivative having up to about 26 carbon atoms although preferred oxides are lower alkyl oxides such as ethylene, propylene, and butylene oxides. Bisphenol compounds including bisphenol-A, bisphenol-F and bissulfone or sulfides. Typically two or more moles of alkyl oxide are coreacted with one mole of bisphenol compound. Preferred compositions are 2:1 molar reactions while suitable molecular weight range of alkylene oxide resins is between 200 and 1,000 as measured by GPC. Other suitable epoxide functional resins include low molecular weight polyepoxides such as epoxidized sorbitol and epoxy novalacs.

In accordance with the process of this invention, direct or reverse let down procedures can be used for inversion of the acrylic grafted epoxy copolymer into water. Ammonia is generally used as the inverting base because ammonia gives no added VOC. Common amines, such as dimethylethanol amine, triethyl amine, or similar tertiary amine can be used, alone or in combination with ammonia. Neutralization levels of the carboxyl functional acrylic graft epoxy copolymer preferably are between 40% and 100% of the available carboxyl groups. The acrylic graft epoxy copolymer is best inverted hot, at its synthesis temperature, as viscosity rises at lower temperatures to the point where inversion into water is difficult. Only low to moderate shear is required for the inversion of the copolymer in water.

Liquid epoxy, such as DER 333 (Dow), and Epon 828 (Shell) can be blended with the acrylic grafted epoxy resin prior to, or after inversion into water. If diepoxide is added to acrylic graft epoxy copolymer prior to inversion (dispersion) into water, care must be taken to avoid acid coreaction of the diepoxide with carboxyl groups on the acrylic epoxy copolymer and resulting gelation. The preferred method is to disperse the acrylic epoxy copolymer into water and thereafter disperse the diepoxide into the aqueous dispersed acrylic epoxy copolymer. Liquid diepoxide at room temperature can be dispersed easily by either method although solid low molecular weight diepoxide at room temperature is more difficult to disperse into the aqueous dispersion of acrylic epoxy copolymer. Low molecular weight liquid diepoxides are preferred and the preferred method is to disperse the liquid diepoxide into the aqueous dispersion of acrylic epoxy copolymer. When the acrylic grafted epoxy and diepoxide are inverted into water, heat can be applied to increase the rate of the acid-epoxy crosslinking reaction.

Catalysts such as tertiary amines, phosphines, pyridine, and the like can be added at low levels (0.1 to 1%) to further increase the acid-epoxy reaction rate. If tertiary amine is used as a portion of the neutralizing base, up to 10% additional amine can be used. Alternately, the acid-epoxy reaction in water can occur at room temperature over a long period of time. Viscosity generally rises as this reaction occurs. The resulting epoxy crosslinked addition copolymers comprise an aqueous micro-dispersion of very small crosslinked polymer particles having a mean microgel particle size below 1.0 microns, desirably less than 0.2 micron, and preferably between 0.02 and 0.2 micron size particles. The carboxyl functional acrylic grafted epoxy copolymer crosslinks with the low molecular weight diepoxide epoxy resin to provide microgel polymer particles having an Acid No. above 30 and preferably between 50 and 150. The aqueous dispersed acrylic-epoxy crosslinked microgel particles provide excellent film forming properties.

On a weight basis, the crosslinked microgel particles comprise 30% to 99% acrylic grafted epoxy copolymer, preferably between 50% and 95% grafted copolymer, with the balance comprising diepoxide resin.

The microgel dispersions have particle sizes under 1.0 microns and can be used as polymeric binders in coatings for containers. The resulting epoxy crosslinked microgel The microgel particles produced by carboxyl functional addition copolymer (dispersing agent) crosslinked by difunctional low molecular weight epoxy surprisingly provides highly crosslinked copolymers in the form of a stable aqueous microdispersion of extraordinary small internally crosslinked microgel polymer particles without the need for external surfactants. Excellent protective film formations on substrates are achieved without surfactants even though the microgel particles are internally highly crosslinked. Hence, high quality coatings for interior beverage cans can be produced with acrylic crosslinked epoxy crosslinked microgel polymeric particles. Aqueous dispersions of these blended resins can be prepared in water with ammonia neutralization with minimal use of volatile solvent and at VOC levels below about one pound per gallon of resin solids and preferably about 0.5 pound per gallon of resin solids. Cured films exhibit excellent water resistance, and good clarity and gloss.

For spraying, preferably the coating composition contains between about 10% and 30% by weight polymeric solids relative to 70% to 90% water including other volatiles such as minor amounts of solvents. For applications other than spraying, the aqueous polymeric dispersions can contain between about 10% and 40% by weight polymer solids. Organic solvents can be utilized to facilitate spray or other application methods and such solvents include n-butanol, 2-butoxy-ethanol-1, xylene, toluene, and preferably n-butanol is used in combination with 2-butoxy-ethanol-1. The coating composition of the present invention can be pigmented and/or opacified with known pigments and opacifiers. For many uses, including food use, the preferred pigment is titanium dioxide. The resulting aqueous coating composition can be applied satisfactorily by conventional methods known in the coating industry. Thus, spraying, rolling, dipping, and flow coating application methods can be used for both clear and pigmented films, although spraying is preferred. After application onto the metal substrate, the coating is cured thermally at temperatures in the range from about 150° C. to 220° C. or higher for time sufficient to effect complete curing as well as volatilizing of any fugitive component therein.

For metal sheet substrates intended as beverage containers and particularly for carbonated beverages such as beer, the coating should be applied at a rate in the range from 0.5 to 15 milligrams of polymer coating per square inch of exposed metal surface. To attain the foregoing, the water-dispersible coating as applied can be as thick as 0.1 to 1 mil.

For a better understanding of the present invention, the following examples are provided. In this application, all parts are parts by weight, all percentages are weight percentages, and temperatures are degrees Centigrade, unless otherwise expressly noted.

EXAMPLE 1

An acrylic grafted epoxy was produced from the following raw materials.

|    | Grams | Raw Material |
|----|-------|--------------|
| a) | 116   | Epon 1009F, solid epoxy, Shell |
|    | 40    | Hexyl Cellosolve |
|    | 40    | Butyl Cellosolve |
|    | 92    | n-butanol |
| b) | 80    | methacrylic acid |
|    | 60    | styrene |
|    | 60    | ethyl acrylate |
|    | 16    | benzoyl peroxide, 78% |
| c) | 36    | dimethylethanol amine |
|    | 15    | ammonia, 28% |
|    | 400   | water |
| d) | 600   | water |

Component group (a) was warmed to 117° C. under a nitrogen blanket and held at about that temperature while component group (b) was added over a period of about 2.5 hours. After components (b) were added, the reaction mixture was held for 0.5 hours and cooled to 100° C. Component group (c) was then added over about 10 minutes to invert and disperse the polymer into water. Water (d) was then added.

EXAMPLES 2–5

The acrylic grafted epoxy of Example 1 was utilized as the based resin in each of the following examples with variable amounts of liquid epoxy (DER 331) equivalent weight about 187 added as indicated below in Table 1. The liquid epoxy was added to the aqueous dispersion of the acrylic grafted epoxy and the dispersion thereof heated to about 90° C. with moderate stirring (300 RPM paddle stirrer) and held at about 90° C. for two hours. The neutralizing base, dimethyl ethanol amine functions as the catalyst for the microgel crosslinking reaction. The resulting reaction mixture comprised a microgel and was cooled to room temperature.

TABLE I

| Material | Ex 2 | Ex 3 | Ex 4 | Ex 5 |
|----------|------|------|------|------|
| Acrylic-g-epoxy (Ex 1) | 250 gm | 250 gm | 250 gm | 250 gm |
| Water | 59 gm | 74 gm | 90 gm | 108 gm |
| DER 331 epoxy | 2.8 gm | 5.9 gm | 9.4 gm | 13.5 gm |

Drawdown test films were applied by No. 16 wire wound bar to tin plate substrate and heat cured at 180° C. for two minutes. Properties of the cured coating films were as follows. The acrylic graft epoxy of Example 1 was included for comparison.

| PROPERTY | EX 2 | EX 3 | EX 4 | EX 5 | EX 1 |
|---|---|---|---|---|---|
| Gloss | High | High | High | High | High |
| Clarity | Good | Good | Good | Good | Good |
| Texture | Smooth | Smooth | Smooth | Smooth | Smooth |
| Water Blush, 100° C. | Slight | None | None | None | Heavy |

EXAMPLE 6

| | | Grams |
|---|---|---|
| A | Epoxy resin solution (EPON 1009; 73% in butyl cellosolve) | 1101 |
| B | Styrene | 115 |
| | Ethyl acrylate | 92 |
| | Methacrylic acid | 138 |
| | | (1.603 moles) |
| | T-butyl perbenzoate | 24.2 |
| C | EG-monobutyl ether | 26.5 |
| D | Cymel 303LF | 132.3 |
| | n Butanol | 20.7 |
| E | Dimethyl ethanolamine | 95.83 |
| | Deionized water | 95.83 |
| F | Deionized water | 1126.7 |
| G | DER 333N liquid epoxy resin | 57.5 |
| H | Deionized water | 650.0 |

PROCEDURE

Heat group A to 150 C. Add group B to the epoxy polymer over two hours, while maintaining temperature of 148–154 C. Add C to rinse monomer. Hold for one hour at 148–152 C. When one hour hold is complete, cool to 125–130 C. Add Cymel 303 at 127 C., followed by n-butanol, group D, at 105–115 C. Premix the amine and water, group E, and add this to the polymer mix at 98–102 C. Hold with good agitation at 96–100 C. for twenty minutes. When amine and water have mixed in well (15–25 minutes), then add the deionized water, group F, over 40–100 minutes while maintaining 88–96 C. After the F addition, at 88–96 C., add the liquid epoxy, group G. Resume addition of deionized water (group H). Hold 88–96 C. for 100–120 minutes after addition of the liquid epoxy.

FINISHED BATCH
NV=37.4% (10 minutes @ 400 F.)
Viscosity, #4 Ford cup=69.6 seconds
Acid number=19.6 (52.4 on NV)
Base number=16.7
VOC=1.67 lbs/gal ASTM D-3960

EXAMPLE #7

ACRYLIC GRAFT EPOXY

| | | |
|---|---|---|
| A) | 75 g | EPON 1009, Shell |
| | 40 g | hexyl cellosolve |
| | 40 g | butyl cellosolve |
| B) | 105 g | methacrylic acid |
| | 140 g | styrene |
| | 105 g | ethyl acrylate |
| | 21 g | t-butyl perbenzoate |

Warm a) to 150 C. under nitrogen. Add b) over 3 hours. Hold ½ hour.

EXAMPLE 8

Add 75 g, EPON 1001 (Shell) to acrylic graft epoxy in example #7. Stir 3 minutes to blend, then add 400 g water containing 55 g ammonium hydroxide (28% NH3) over 10 minutes to invert. Add 1025, water containing 8.2 g dimethylethanol amine, heat to 90 C., stir 2 hours, cool. (15% EPON 1001 on solids).

EXAMPLE 9

Repeat as in Example 8. but use 75 g EPON 1004 (Shell) to replace EPON 1001. ( 15% EPON 1004 on solids).

EXAMPLE 10

Repeat as in Example 8, but omit EPON 1001 and EPON 1004, and reduce final water addition to 800 g.

EXAMPLE 11

To 895 g of aqueous dispersion from example 10 add 37.5 g DER 333 and 112.5 water. Heat to 90 C., stir 2 hours and cool. (15% DER 333 on solids).

EXAMPLE 12

To 895 g of aqueous dispersion from example 10 add 18.8 g DER 333 and 56 g water. Hold 2 hours at 90 C. Cool (7.5% DER 333 on solids).

Bake films from example 8,9, 11, and 12 by applying microgel dispersions to aluminum panels with a number 16 wire wound bar. Bake at 360 F. for 2 minutes. Prepare a second set of panels, and baked at 360 F. for 5 minutes. Check appearance. Measure water resistance by placing panels in boiling deionized water for 5 minutes. Check blush upon removal.

TABLE 2

| | RESULTS | | |
|---|---|---|---|
| FILM OF EXAMPLE | APPEARANCE | 2 MIN. BAKE WATER BLUSH | 5 MIN BAKE WATER BLUSH |
| #8 | clear, glossy, smooth | slight blush | no blush |
| #9 | clear, glossy, smooth | heavy blush | medium-heavy blush |
| #11 | clear, glossy, smooth | no blush | no blush |
| #12 | clear, glossy, smooth | slight blush | no blush |

Excellent clarity and glass was obtained for each microgel dispersion, but water resistance was much better for EPON 1001 and DER 333 than for EPON 1004. DER 333 performed as well as EPON 1001 at only 7.5% on solids. Lower molecular weight liquid diepoxide resins like DER 333 and EPON 1001 provide superior coatings (as compared to higher molecular weight diepoxide resins like EPON 1004) when used to crosslink acrylic graft epoxy dispersions.

Although the merits of this invention have been specifically described and illustrated in the examples, the invention is not intended to be limited except by the appended claims.

We claim:

1. An aqueous dispersed coating composition containing an aqueous dispersed polymeric binder, the polymeric binder comprising:

aqueous dispersed, crosslinked microgel polymer particles having a mean particle size less than one micron, the polymer particles being a carboxyl functional, carbon grafted, acrylic-epoxy copolymer crosslinked with a low molecular weight diepoxide resin, the diepoxide having a number average weight molecular weight between 200 and 5,000 and an equivalent weight between 100 and 1,000, where the crosslinked microgel polymer particles contain between 30% and 99% of said acrylic-epoxy copolymer with the balance being the low molecular weight diepoxide resin; and Where the acrylic-epoxy copolymer is produced by in-situ non-aqueous copolymerization of ethylenically unsaturated monomer in the presence of epoxy resin at temperatures between about 80° C. and 180° C. in the presence of at least 1% peroxide initiator based on the weight of monomers where at least 5% by weight of the ethylenic monomers is carboxyl monomer, to produce the carboxyl functional carbon-grafted acrylic-epoxy copolymer where the copolymer has an Acid No. above about 30, where said acrylic-epoxy copolymer is then dispersed in water by neutralizing at least part of the carboxyl functionality on said acrylic-epoxy copolymer to form an aqueous dispersed of carboxyl containing acrylic-epoxy copolymer, and where the diepoxide resin is dispersed into the aqueous dispersed acrylic-epoxy copolymer and reacted with the carboxyl functionality on the acrylic-epoxy copolymer to crosslink the acrylic-epoxy copolymer to form aqueous dispersed crosslinked microgel polymer particles stably dispersed in water.

2. The coating composition of claim 1 where the microgel particles are between about 0.02 and 0.2 microns.

3. The coating composition of claim 1 where the grafted acrylic-epoxy copolymer has an Acid No. between 70 and 300 prior to microgel formation.

4. The coating composition of claim 1 where the diepoxide crosslinking resin has a molecular weight between 360 and 1,000.

5. The coating composition of claim 1 where the diepoxide has an equivalent weight between 180 and 500.

6. The coating composition of claim 1 where the polymeric binder contains between 50% to 95% grafted acrylic-epoxy copolymer with the balance being diepoxide in said microgel particles.

7. In a process for producing an aqueous dispersed coating composition containing an aqueous dispersed polymeric binder, the process steps comprising:

copolymerizing by in-situ, non-aqueous polymerization of ethylenically unsaturated monomer, including carboxyl functional monomer, in the presence of epoxy resin and in the presence of at least 1% peroxide initiator based on the weight of the monomer copolymerized, at temperatures between about 80° C. and 180° C. to produce a carboxyl functional acrylic carbon grafted epoxy copolymer having an Acid No. above 30;

combining the acrylic grafted epoxy copolymer with diepoxide while dispersing into water by neutralizing carboxyl groups on the copolymer to provide an aqueous dispersion of acrylic grafted epoxy copolymer and diepoxide; and crosslinking the diepoxide with the carboxyl functional acrylic graft epoxy copolymer to produce stabized, aqueous dispersed, microgel polymer particles, having a mean particular size less than 1.0 micron.

8. The process of claim 7 where the diepoxide is mixed with acrylic grafted epoxy copolymer prior to dispersing into water.

9. The process of claim 7 where the acrylic grafted epoxy copolymer is first dispersed into water and the diepoxide is dispersed into the aqueous dispersion of the copolymer.

10. The process of claim 7 where the low molecular weight diepoxide is a liquid diepoxide at room temperature.

11. The process of claim 8 where the low molecular weight diepoxide is a liquid diepoxide at room temperature.

12. The process of claim 9 where the low molecular weight diepoxide is a liquid diepoxide at room temperature.

13. The process of claim 8 where the diepoxide is solid diepoxide at room temperature.

14. The process of claim 7 where the equivalent weight of the diepoxide is between 180 and 500.

15. The process of claim 7 where 30% to 99% acrylic grafted epoxy copolymer is crosslinked with 1% to 70% diepoxide.

16. The process of claim 7 where the crosslinked microgel particles have an average particle size between 0.02 and 0.2 microns.

17. The process of claim 7 where the acrylic grafted-epoxy copolymer has an Acid No. between 70 and 300 mg KOH per gram resin solids prior to crosslinking with the diepoxide.

* * * * *